(12) United States Patent
Gebby

(10) Patent No.: US 7,416,510 B2
(45) Date of Patent: Aug. 26, 2008

(54) CONTROL OF A VEHICLE POWERTRAIN WITH MULTIPLE PRIME MOVERS

(75) Inventor: Brian P Gebby, Ferndale, MI (US)

(73) Assignee: Chrysler LLC, Auburn Hills, MI (US)

( * ) Notice: Subject to any disclaimer, the term of this patent is extended or adjusted under 35 U.S.C. 154(b) by 271 days.

(21) Appl. No.: 11/300,881

(22) Filed: Dec. 15, 2005

(65) Prior Publication Data

US 2007/0142166 A1    Jun. 21, 2007

(51) Int. Cl.
    *B60K 5/08*     (2006.01)
(52) U.S. Cl. .......................................... 477/2
(58) Field of Classification Search ................ 477/2, 477/905
    See application file for complete search history.

(56) References Cited

U.S. PATENT DOCUMENTS

| 6,306,056 | B1 | 10/2001 | Moore |
| 6,474,068 | B1 | 11/2002 | Jalil et al. |
| 6,830,532 | B1 | 12/2004 | Gebby et al. |
| 6,852,062 | B1 * | 2/2005 | Ahner et al. ............. 477/2 |
| 2004/0138023 | A1 * | 7/2004 | Moore et al. ............. 477/2 |
| 2004/0173174 | A1 * | 9/2004 | Sugino et al. ........ 123/179.28 |

* cited by examiner

*Primary Examiner*—Sherry Estremsky
*Assistant Examiner*—Edwin A Young
(74) *Attorney, Agent, or Firm*—Ralph E. Smith

(57) ABSTRACT

A vehicle powertrain having multiple prime movers including a primary prime mover coupled inline to a transmission and a secondary prime mover selectively coupled to the transmission by a substantially concentric coupling. A method of powertrain control is also disclosed, wherein powertrain torque demand and torque available from the primary prime mover and the transmission within its present gear ratio are determined and compared. Output of the primary prime mover is increased if the powertrain torque demand does not exceed the torque available. Otherwise, the transmission is downshifted to a lower gear ratio. Torque demand is compared to torque available from the primary prime mover and the transmission within its now downshifted gear ratio. Output of the primary prime mover is increased if torque demand does not exceed torque available. Otherwise the secondary prime mover is started, its output increased, and the transmission is shifted to a higher gear ratio.

16 Claims, 3 Drawing Sheets

CONTROL OF A VEHICLE POWERTRAIN WITH MULTIPLE PRIME MOVERS

FIELD OF THE INVENTION

The present invention relates generally to a vehicle powertrain, and more particularly to control of a vehicle powertrain having a transmission operable selectively or simultaneously from multiple diverse prime movers.

BACKGROUND OF THE INVENTION

Various types of prime movers are used in current production automobiles. Prime movers are machines, such as motors and engines, in which work is accomplished by the conversion of various forms of energy into mechanical force and motion. For example, motors convert electric energy into mechanical energy, and engines transform chemical energy into mechanical energy. Such vehicle engines are sized to meet relatively high load requirements, such as hill climbing or rapid acceleration from standstill. But during normal city and highway vehicle operation at cruising speeds, a vehicle engine is often operated according to relatively low loads. Accordingly, vehicle engines usually operate at excess capacity, which can result in relatively low engine efficiency and high fuel consumption.

Several approaches have been proposed to modify a vehicle powertrain to yield higher engine efficiency and lower fuel consumption, including the use of multiple separate engines coupled to a conventional automatic transmission. When such a vehicle is operated at a relatively low torque demand from the operator, only one of the engines is employed to propel the vehicle. When torque demand exceeds the maximum torque output of the single engine, a second engine is activated in synchronism with the first engine and is engaged to the transmission to supplement the first engine torque output to the transmission.

But several drawbacks have been noted with this arrangement. For example, existing engine output couplings are typically not highly reliable, usually do not provide smooth operation transparent to the vehicle operator, and are often relatively expensive. Furthermore, existing coupling mechanisms do not always enable the engines to be coupled relatively quickly, and may involve substantial lag time between the vehicle operator's demand for additional torque and the delivery of additional torque via the second engine. Finally, in a powertrain with multiple engines, the initializing, activating, and/or synchronizing of additional engines is relatively fuel inefficient.

SUMMARY OF THE INVENTION

In one presently preferred implementation, there is disclosed a method of controlling a vehicle powertrain having a transmission and multiple prime movers including a primary prime mover coupled inline to the transmission and a secondary prime mover selectively coupled to the transmission by a substantially concentric coupling. The method includes determining powertrain torque demand, determining torque available from the primary prime mover and the transmission within its present gear ratio, and comparing the powertrain torque demand with the torque available from the primary prime mover and the transmission within its present gear ratio. The method also includes increasing output of the primary prime mover if the powertrain torque demand does not exceed the torque available from the primary prime mover and the transmission within its present gear ratio, and otherwise downshifting the transmission to a lower gear ratio if torque demand exceeds torque available from the primary prime mover and the transmission within its present gear ratio. The method further includes the following steps: comparing torque demand to torque available from the primary prime mover and the transmission within its downshifted gear ratio, increasing output of the primary prime mover if torque demand does not exceed torque available from the primary prime mover and the transmission within its downshifted gear ratio, otherwise activating the secondary prime mover and increasing output of the secondary prime mover to meet the torque demand if torque demand exceeds torque available from the primary prime mover and the transmission within its downshifted gear ratio, and upshifting the transmission to a higher gear ratio.

According to a preferred aspect of the method, the method may also include comparing torque demand to torque available from the combination of the secondary prime mover and the primary prime mover, and determining if the torque demand can be fulfilled by reducing torque output from both prime movers or by decoupling the secondary prime mover and downshifting the transmission.

In another presently preferred implementation, there is disclosed a vehicle powertrain for driving wheels of a vehicle includes a transmission having an operational axis and at least one transmission ratio change device, and a primary prime mover coupled to the transmission, having an operational axis substantially aligned with the operational axis of the transmission, and further having an electronically controlled throttle. The powertrain also includes a secondary prime mover being selectively coupled to the transmission, having an operational axis substantially parallel to and offset from the operational axis of the primary prime mover, and further having an electronically controlled throttle. A passive coupling is substantially concentric with the operational axes of the transmission and primary prime mover, and is interposed between the transmission and the primary and secondary prime movers, and a high-speed starter configuration is operatively engaged with the secondary prime mover for activating the secondary prime mover. According to a particularly preferred aspect of the vehicle powertrain, at least one controller may be in communication with the electronically controlled throttles and the at least one transmission ratio change device, and may be configured to control operation of the first and secondary prime movers and the transmission and carry out the following method described above.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
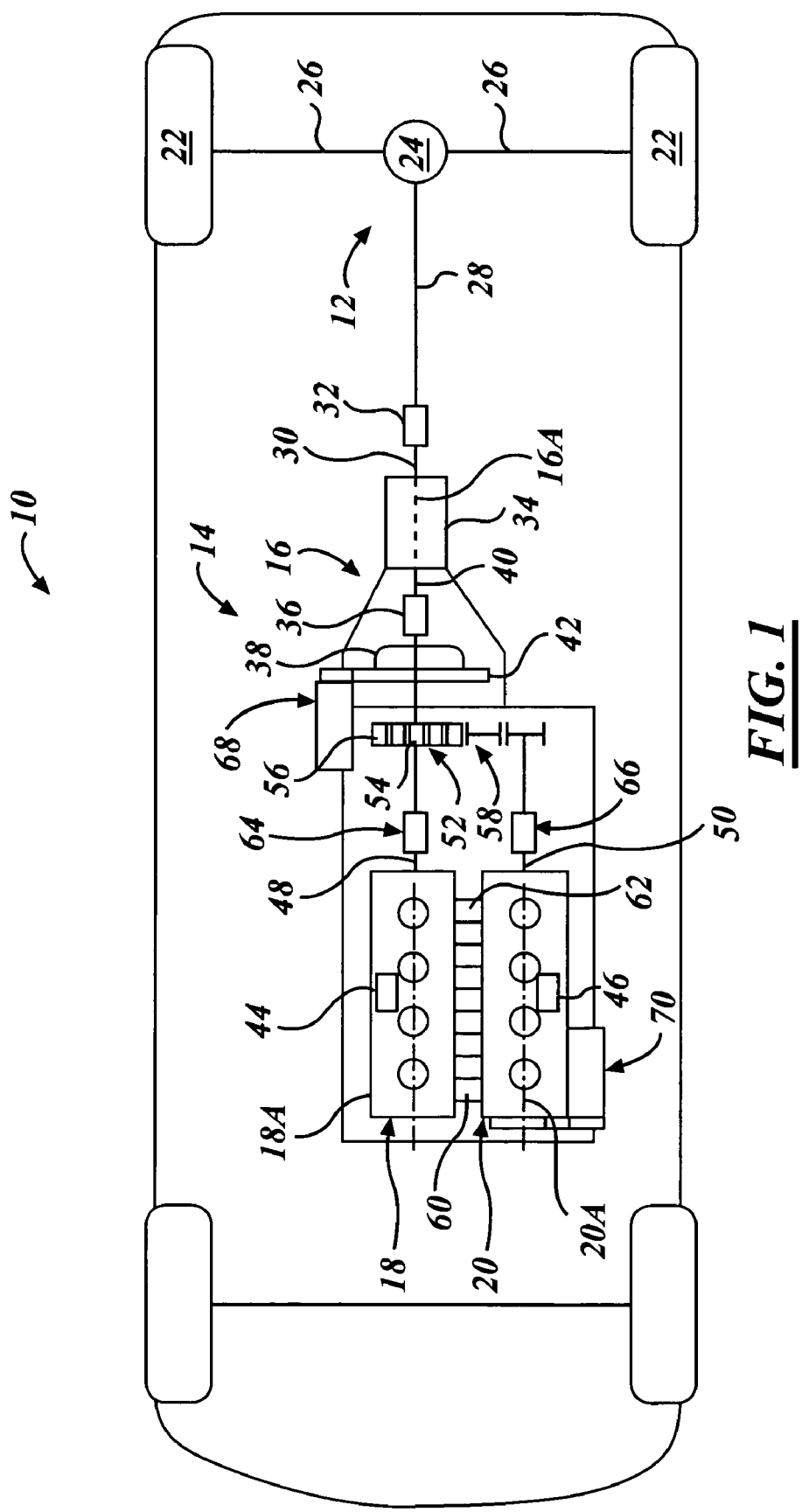
FIG. 1 is a schematic diagram of a vehicle having an exemplary embodiment of a powertrain.

Referring in more detail to the drawings, FIG. 1 illustrates a vehicle 10 having a drivetrain 12 powered by a powertrain 14, which generally includes a transmission 16 and multiple prime movers 18, 20 for powering the transmission 16. The drivetrain 12 generally includes a pair of driving wheels 22, a differential or axle 24 coupled to the driving wheels 22 via axle shafts 26, and a propshaft or driveshaft 28 connected to an output shaft 30 of the transmission 16. Accordingly, rotational power is transmitted from the transmission 16, through the driveshaft 28 and axle 24, and to the driving wheels 22 through the axle shafts 26 to propel the vehicle 10 down the road.

The transmission 16 is preferably an automatic transmission. Any suitable automatic transmission may be used, including a variable ratio transmission or a fixed ratio transmission such as a rear-wheel-drive, electronic, automatic transmission available from the assignee hereof. The transmission 16 preferably includes an associated output speed sensor 32, a gearbox 34 upstream of the output speed sensor 32, an associated input speed sensor 36 upstream of the gearbox 34, a torque converter 38 upstream of the input speed sensor 36 and having an output side connected to an input shaft 40 of the gearbox 34. The gearbox 34 of the transmission 16 preferably includes a plurality of selectively engageable internal gear sets (not shown) interconnected between the input and output shafts 40, 30 to thereby rotate its output shaft 30 at desired speeds relative to its input shaft 40 preferably according to a plurality of predetermined fixed gear ratios. It is also contemplated, however, that the "gearbox" could instead include a variable ratio device to provide continuously or infinitely variable gear ratios between upper and lower predetermined gear ratio limits. In any case, the transmission 16 has an operational axis 16A or transmission centerline about which internal components of the transmission 16 typically rotate.

The multiple prime movers 18, 20 are independent or diverse and include a primary prime mover 18 having an operational axis 18A, and a secondary prime mover 20 having an operational axis 20A that is shown as being substantially parallel to that of the primary prime mover 18. Each prime mover 18, 20 preferably includes an associated individual electronically controlled throttle 44, 46 for controlling the output of the respective prime movers 18, 20. The multiple prime movers 18, 20 are preferably internal combustion heat engines, such as gasoline or diesel engines but may be any types of prime movers suitable for use in a vehicle. More specifically, the prime movers 18, 20 are preferably integrated into a unified powerplant that may include dual inline four cylinder internal combustion engines with individual crankshafts, a single V-eight cylinder internal combustion engine with dual crankshafts, or other configurations. It is contemplated, however, that the multiple prime movers 18, 20 can include any suitable quantity of independent prime movers and can be engines having any suitable number of cylinders.

The operational axis 18A of the primary prime mover 18 is preferably substantially coaxially aligned with the operational axis 16A of the transmission 16. More specifically, a primary prime mover crankshaft or output shaft 48 is preferably directly coupled inline to the transmission 16 for high efficiency. More specifically, the output shaft 48 of the primary prime mover 18 is preferably directly connected to a flexplate 42, which is directly connected to the torque converter 38 of the transmission 16.

The operational axis 20A of the secondary prime mover 20 is preferably axially offset or spaced apart from the operational axis 16A of the transmission 16. The secondary prime mover 20 is preferably indirectly and selectively coupled to the transmission 16 using a coupling 52 substantially concentrically connected to the output shaft 48 of the primary prime mover 18. Preferably, the coupling 52 is a passive device that does not require any activation from an external source such as a controller, or the like. For example, the coupling 52 may be a purely mechanical one-way clutch such as an overrunning or sprag clutch, or the like, with an inner element 54 connected to the crankshaft or output shaft 48 of the primary prime mover 18 and with an outer element 56 coupled to a crankshaft or output shaft 50 of the secondary prime mover 20 via an offset coupling 58, such as a high velocity chain drive, a geartrain, or other configurations. Those of ordinary skill in the art will recognize that high velocity chain drives may include suitable chains and drive and driven sprockets. The couplings 52, 58 have few components, are highly reliable mechanical devices, and enable the secondary prime mover 20 to be quickly coupled to the transmission 16. Thus, the secondary prime mover 20 is selectively coupled to the transmission 16 such that it must first be activated and its crankshaft 50 brought up to substantially the same speed as the crankshaft 48 of the primary prime mover 18 in order to be coupled to the transmission 16.

The unified powerplant including the diverse prime movers 18, 20 preferably includes opposite sides including the separate crankshafts 48, 50 connected to respective connecting rods and pistons (not shown) within respective cylinders of each of the sides. Although the opposite sides are separately operable, they may share the following common elements (not shown) including: a common oil pump, water pump, air filter, fuel supply, engine block, exhaust system, and oil pan. The opposite sides may also share common coolant passages 60 and lubricant oil passages 62 between and in communication with the prime movers 18, 20. Accordingly, coolant and lubricant oil is shared between the prime movers 18, 20, thereby allowing the secondary prime mover 20 to be easily started after the primary prime mover 18 has been started and running for some period of time.

The vehicle powertrain may include miscellaneous other components. Output speed sensors 64, 66 are suitably arranged for sensing the speed of the output shafts or crankshafts 48, 50 of the prime movers 18, 20. Also, a first starter 68 is preferably engaged to the flexplate 42 for activating the primary prime mover 18. For example, the first starter 68 may be a conventional starter arrangement with a starter motor driven pinion gear in mesh with gear teeth on the circumference of the flexplate 42. Moreover, a second starter 70 is preferably linked to an upstream end of the crankshaft 50 of the secondary prime mover 20.

The second starter 70 may be any suitable starting device operatively connected to the secondary prime mover 20, but is preferably a relatively high-speed starter arrangement. For example, a conventional starter may be coupled to the crankshaft 50 of the secondary prime mover 20 such as by a geartrain, wherein the gear ratio between the starter drive pinion and the crankshaft driven gear may be closer to 1:1 than compared to a conventional starter gear ratio. Standard flexplate-mounted conventional starters typically have a mechanical advantage of 20+ to 1 for cold weather starting requirements. The closer to 1:1 lower gear ratio is possible because the secondary prime mover 20 has reduced initial friction because it is already warm and lubricated from operation of the primary prime mover. In another example, a conventional starter may be coupled to the crankshaft 50 by or one or more pulleys and belts similar to that of an accessory drive arrangement having a similar ratio as described above. In a further example, a conventional drive to driven ratio may be used with a relatively higher speed starter. In any case, it is preferable to use a relatively high-speed starter arrangement.

Figure 2:
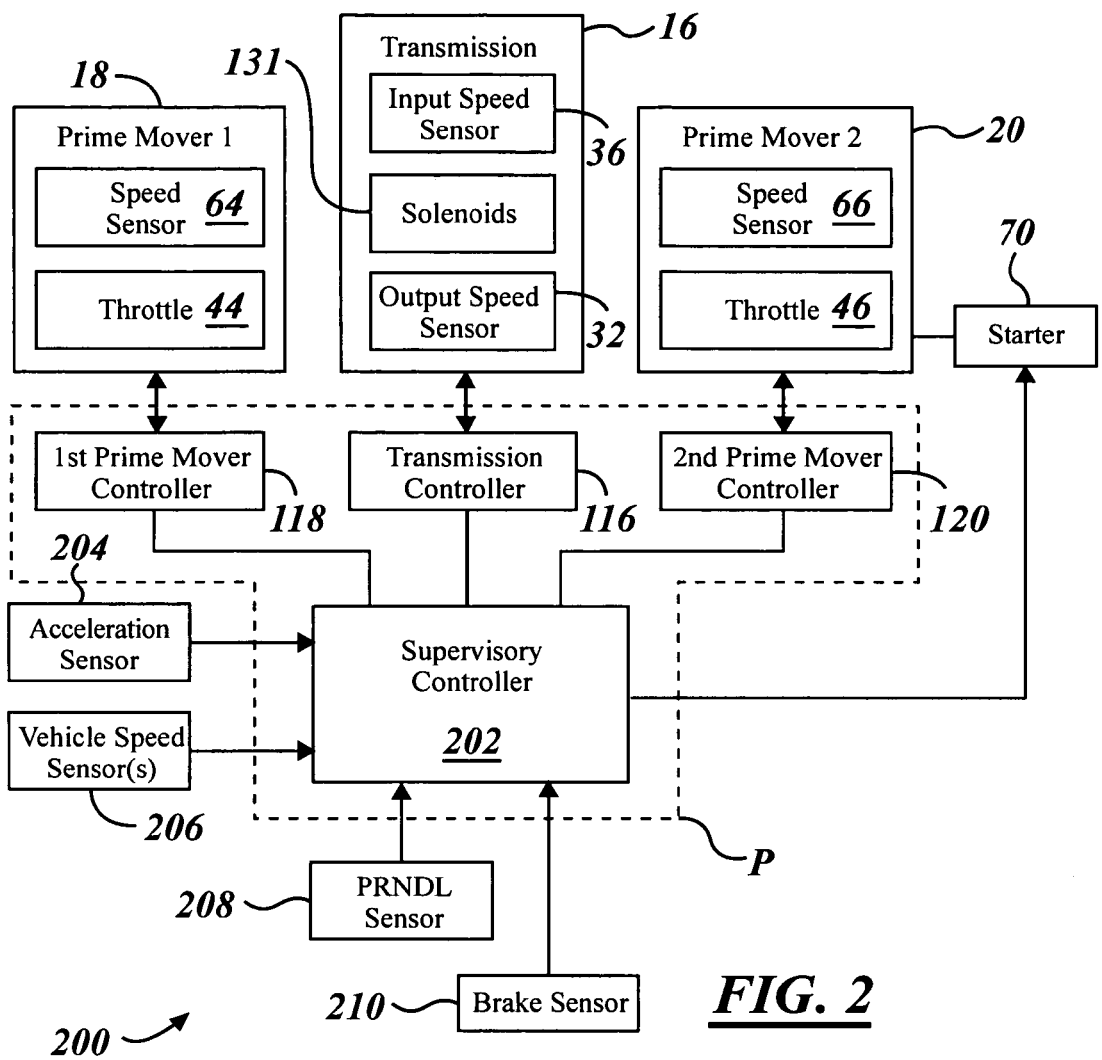
FIG. 2 is a block diagram of a powertrain control system for the powertrain of FIG. 1.

Referring now to FIG. 2, a powertrain control system 200 includes the prime movers 18, 20 and associated controllers 118, 120, the transmission 16 and an associated controller 116, and a supervisory controller 202 in communication with the controllers 116-120 of the transmission 16 and prime movers 18, 20. Alternatively, those of ordinary skill in the art will recognize that any combination of any of the controllers 116-120, 202 could be integrated into a single powertrain controller P as exemplified by the dashed lines. Those of ordinary skill in the art will also recognize that the controllers 116-120, 202 may be any suitable electronic device(s) for receiving, storing, and transmitting data, and executing program instructions and may include any suitable memory and processor devices.

The prime mover controllers 118, 120 are configured to control operation of the prime movers 18, 20 by receiving suitable input signals therefrom as well as from any other suitable vehicle sources, also by executing suitable programs, and by generating suitable output signals back to the prime movers 18, 20. More specifically, the controllers 118, 120 may receive input signals from the throttles 44, 46, the speed sensors 64, 66, and/or any other suitable sensors or devices. The controllers 118, 120 may then execute suitable engine control programs to generate output signals to the throttles 44, 46 and/or any other suitable devices, to adjust operation and output of the prime movers 18, 20.

The transmission controller 116 is configured to control operation of the transmission 16 by receiving suitable input signals therefrom and any other suitable vehicle sources, also by executing suitable programs based on such input, and by generating suitable output signals back to the transmission 16. More specifically, the controller 116 may receive input signals from the transmission input and output shaft speed sensors 36, 32, hydraulic pressure sensors (not shown), and/or other suitable sensors. The controller 116 may then execute suitable transmission shift schedule or ratio change programs to generate output signals to transmission ratio change devices. For example, the controller 116 may control electro-hydraulic shift solenoids 131 disposed within hydraulic circuits in the transmission 16 for activating and deactivating clutches or other devices (not shown) to change gear sets and/or adjust sheaves and thereby effect changes in transmission gear ratio.

The supervisory controller 202 is operable for monitoring torque demand on the powertrain 14 and controlling the first and secondary prime movers 18, 20 as well as the transmission 16 in accordance with the torque demand. In general, the supervisory controller 202 is configured to communicate with the transmission and primary mover controllers 116-120, and control functionality of the controllers 116-120 by receiving suitable input signals therefrom and any other suitable vehicle sources, also by executing suitable programs based on such input, and by generating suitable output signals back to the other controllers 116-120. More specifically, the supervisory controller 202 may receive input signals from the controllers 116-120, an accelerator sensor 204, a vehicle speed sensor 206, a transmission mode selection or PRNDL position sensor 208, a vehicle brake sensor 210, and/or other like input sources. The supervisory controller 202 may then execute suitable powertrain control programs to generate suitable output signals to the controllers 116-120, the secondary primary mover starter 70, and/or any other suitable vehicle devices.

Again, it is contemplated that the supervisory controller 202 can be in direct communication with any of the aforementioned vehicle devices and/or sensors, instead of in indirect communication therewith through the other controllers 116-120. In any case, the supervisory controller 202 ultimately controls the throttle 44 of the primary prime mover 18, the starting and stopping of the secondary prime mover 20 via the starter 70, the throttle 46 of the secondary prime mover 20, and transmission shifts or adjustments.

Figure 3:
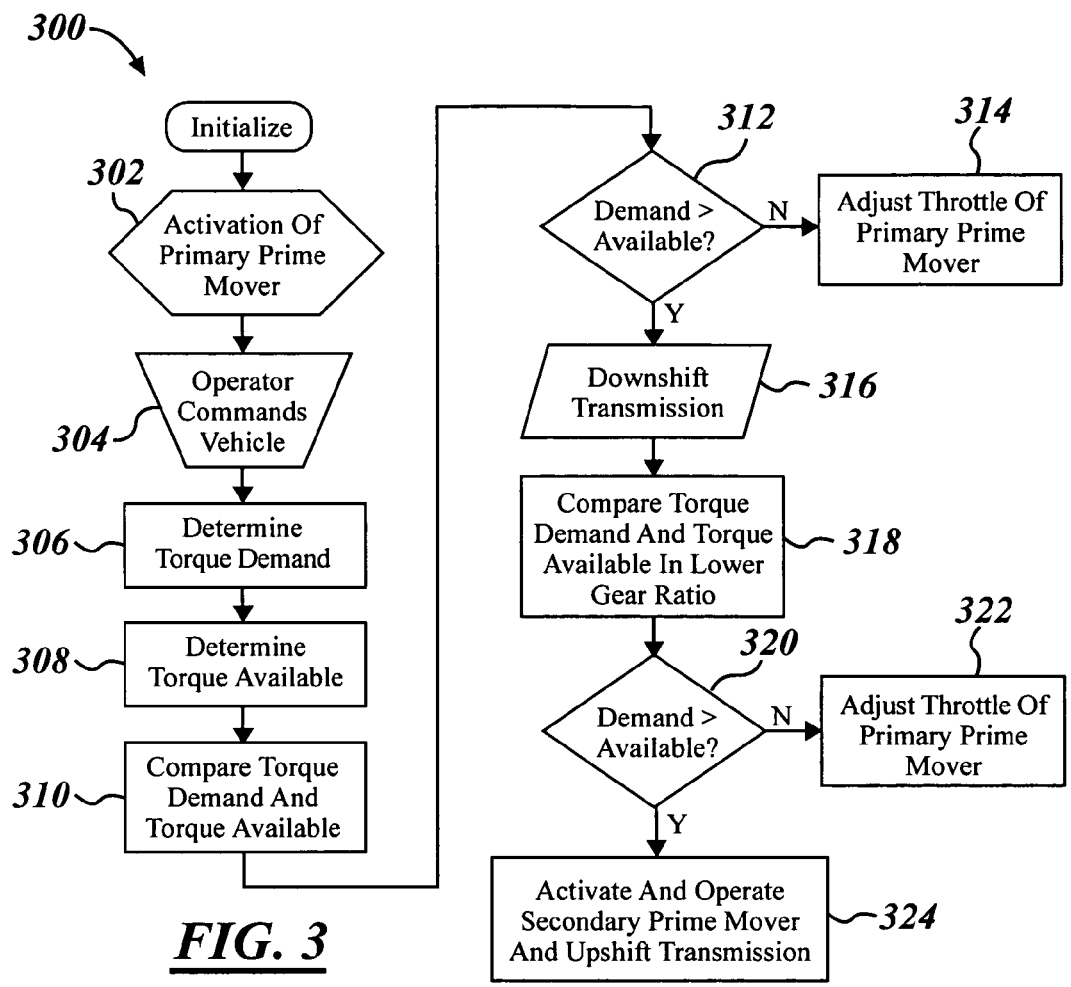
FIG. 3 is a flow chart illustrating a method of controlling the powertrain of FIG. 1.

In operation, and referring primarily to FIG. 3 with additional reference to FIGS. 1 and 2, a preferred method 300 of operating the control system 200 of the powertrain 100 is shown in flow chart form.

At step 302, the primary prime mover starter 68 may be activated when a vehicle ignition device (not shown) is activated, thereby rotating the flexplate 42 and cranking the primary prime mover 18 until it runs on its own. Those of ordinary skill in the art will recognize that the primary prime mover controller 118 may also suitably regulate fuel and spark parameters to activate and run the primary prime mover 18. At this point, the controller 118 is powered and monitoring various outputs from the primary prime mover 18, transmission 16, and/or any other suitable sources.

At step 304, the vehicle operator takes the vehicle out of park and places the vehicle in gear such as by suitably actuating a gearshift lever (not shown), and thereafter depresses the vehicle accelerator pedal (not shown), whereupon the supervisory controller 202 receives signals from the PRNDL sensor 208, the accelerator position sensor 204, and the vehicle speed sensor 206.

At step 306, the supervisory controller 202 determines powertrain torque demand as a function of signals received from the accelerator position sensor 204 in response to the vehicle operator depressing the vehicle accelerator pedal, and preferably as a function of input from the vehicle speed sensor 206. For example, the supervisory controller 202 may calculate the rate of change of the accelerator position, which rate may represent desired acceleration by the vehicle operator, and is indicative of powertrain torque demand. Those of ordinary skill in the art will recognize that powertrain torque demand may be derived from actual values obtained from various vehicle and/or powertrain sensors alone, or in combination with one or more predetermined torque and/or acceleration threshold values, formulas, look-up tables, PID algorithms, and/or the like.

At step 308, the supervisory controller 202 determines torque available from the powertrain 14. Those of ordinary skill in the art will recognize that the torque available may be derived from actual values obtained from vehicle sensors alone such as primary prime mover and transmission sensors, or in combination with formula(s), look-up tables(s), PID algorithm(s), and/or the like.

At step 310, the supervisory controller 202 compares torque demand with torque available from the primary prime mover 18 and the transmission 16 within its present gear ratio.

At step 312, if the supervisory controller 202 determines that the torque demand does not exceed the amount of torque available from the primary prime mover 18 and the transmission 16 within its present gear ratio, then the supervisory controller 202 continues to control the primary prime mover 18 according to normal operating parameters as shown at step 314. For example, the supervisory controller 202 may suitably adjust the throttle 44 of the primary prime mover 18 to increase output of the primary prime mover 18, if necessary. If, however, at step 312, the supervisory controller 202 determines that the torque demand exceeds the torque available from the primary prime mover 18 and the transmission 16 within its present gear ratio, then the supervisory controller 202 will command a transmission downshift as shown at step 316. For example, the supervisory controller 202 may transmit a signal to the transmission controller 116 to downshift the transmission 16 from its present gear ratio to a lower gear ratio. More specifically, the transmission controller 116 may effect the downshift by transmitting suitable signals to suitable transmission ratio change devices such as electro-hydraulic solenoids 131 within the transmission 16 so as to apply or disengage suitable clutches associated with suitable gear sets, variable sheaves, and/or the like (not shown).

At step 318, the supervisory controller 202 now compares torque demand to torque available from the primary prime mover 18 and the transmission 16 within its now downshifted gear ratio.

At step 320, if the torque demand does not exceed the amount of torque available from the primary prime mover 18 and the transmission 16 within its now downshifted gear ratio, then the supervisory controller 202 continues to control the primary prime mover 18 according to normal operating parameters as shown at step 322. For example, the supervisory controller 202 may suitably adjust the electronic throttle 44 of the primary prime mover 18 to increase output of the primary prime mover 18 if necessary. If, however, at step 320, the supervisory controller 202 determines that the torque demand still exceeds the torque available from the primary prime mover 18 and the transmission 16 within its now downshifted gear ratio, then the supervisory controller 202 will command activation and operation of the secondary prime mover 20 as well as a simultaneous or subsequent upshift of the transmission 16, as shown at step 324.

At step 324, the supervisory controller 202 sends a command signal to the secondary prime mover controller 120, which in turn may send a signal to the starter 70 to activate the secondary prime mover 20. Those of ordinary skill in the art will recognize that the secondary prime mover controller 120 may also suitably control fuel and spark parameters of the secondary prime mover 20 to activate the secondary prime mover 20 and initially stabilize its operation. Because the secondary prime mover 20 shares coolant and lubrication with the already warm primary prime mover 18, the secondary prime mover 20 is relatively easily and quickly started. The supervisory controller 202 also preferably commands the secondary prime mover controller 120 to adjust the secondary prime mover throttle 46 to increase output thereof and thereby provide a secondary prime mover torque equal to the difference between the torque demand and the torque available from the primary prime mover 18 and the transmission 16 within its now upshifted gear ratio.

The torque output from the secondary prime mover 20 is communicated to the transmission 16 through the secondary prime mover output shaft 50, the high velocity chain drive 58 and coupling 52, the prime mover output shaft 48, and the flexplate 42. The coupling 52 is a simple, robust mechanical device, and there is no need to control or actuate the coupling 52. As the secondary prime mover 20 quickly comes up to speed, torque from the secondary prime mover 20 will be imparted to the transmission 16 to supplement the inadequate torque being supplied from the primary prime mover 18. When quick vehicle acceleration is requested by the vehicle operator and, thus, torque demanded, the supervisory controller 202 commands the transmission 16 to downshift, which action usually provides the required torque. In more extreme cases, the secondary prime mover 20 may thereafter be invoked by the supervisory controller 202 to provide additional required torque and the transmission 16 may be subsequently or simultaneously upshifted. This process is more fuel efficient than prematurely activating a secondary prime mover and/or maintaining a transmission in a downshifted state for a prolonged period of time.

Preferably, the method may also include steps of comparing torque demand to torque available from the combined operation of the secondary prime mover and the primary prime mover, and then determining if the torque demand can be fulfilled by either reducing torque output from both prime movers or by decoupling the secondary prime mover and downshifting the transmission. Simply adjusting the throttles of the prime movers to reduce torque output therefrom is less noticeable to a driver than a downshift of the transmission and decoupling of the secondary prime mover. However, downshifting of the transmission, and decoupling and idling of the secondary prime mover is preferred for fuel economy. Accordingly, the determining step may include use of predetermined criteria to decide under what types of driving conditions it is preferable to simply reduce torque output of the prime movers or decouple the secondary prime mover and downshift the transmission.

Figure 4:
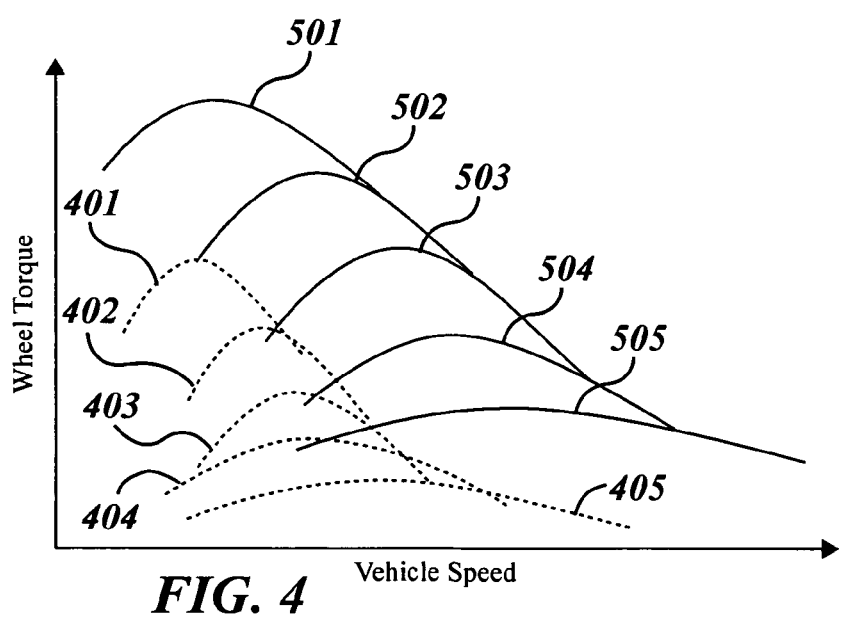
FIG. 4 is a graph of vehicle dynamics information showing wheel torque plotted versus vehicle speed for several different transmission gear ratios with both a single engine operating and dual engines operating.

FIG. 4 illustrates torque output of the powertrain 14 according to five separate gear ratios across a speed range of the vehicle 10. The dashed lines 401-405 illustrate powertrain torque output curves when only the primary prime mover 18 is operational. The solid lines 501-505 illustrate powertrain torque output curves when both the primary and secondary prime movers 18, 20 are operational. According to the control system 200 and method 300 described herein, if the vehicle 10 is operating according to curve 404 and the vehicle operator depresses the accelerator pedal at a relatively low vehicle speed to demand additional torque, then it is preferred to downshift the transmission 16 to curve 403 just prior to activation and throttle advance of the secondary prime mover 20 and simultaneous or subsequent upshift of the transmission 16 for an overlapping and smooth transition to curve 503.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the prime movers have been described as being engines and, more specifically internal combustion engines, the prime movers could be otherwise turbines, electric or hydraulic motors, or other devices. Of course, still other modifications and substitutions can be made. The invention is defined by the following claims.

What is claimed is:

1. A method of controlling a vehicle powertrain having a transmission and multiple prime movers including a primary prime mover coupled inline to the transmission and a secondary prime mover selectively coupled to the transmission by a substantially concentric coupling, the method comprising the steps of:

determining powertrain torque demand;

determining torque available from the primary prime mover and the transmission within its present gear ratio;

comparing the powertrain torque demand with the torque available from the primary prime mover and the transmission within its present gear ratio;

increasing output of the primary prime mover, if the powertrain torque demand does not exceed the torque available from the primary prime mover and the transmission within its present gear ratio;

downshifting the transmission to a lower gear ratio, if torque demand exceeds torque available from the primary prime mover and the transmission within its present gear ratio;
comparing torque demand to torque available from the primary prime mover and the transmission within its downshifted gear ratio;
increasing output of the primary prime mover, if torque demand does not exceed torque available from the primary prime mover and the transmission within its downshifted gear ratio;
activating the secondary prime mover and increasing output of the secondary prime mover to meet the torque demand, if torque demand exceeds torque available from the primary prime mover and the transmission within its downshifted gear ratio; and
upshifting the transmission to a higher gear ratio.

2. The method of claim 1, further comprising the steps of:
determining vehicle speed and vehicle accelerator position; and
calculating a rate of change of accelerator position;
wherein the step of determining powertrain torque demand is performed as a function of the vehicle speed and accelerator position and determining the rate of change of the accelerator position.

3. The method of claim 1 wherein the step of increasing output of the prime movers is carded out by adjusting electronically controlled throttles of the prime movers.

4. The method of claim 1 wherein the step of activating the secondary prime mover includes activating a high-speed starter configuration coupled to a crankshaft of the secondary prime mover.

5. The method of claim 1 wherein the steps of downshifting and upshifting the transmission includes generating output signals to electro-hydraulic shift solenoids.

6. The method of claim 1 further comprising the steps of:
comparing torque demand to torque available from the combined operation of the secondary prime mover and the primary prime mover; and
determining if a reduction in torque demand can be fulfilled by either reducing torque output from both prime movers or by decoupling the secondary prime mover and downshifting the transmission.

7. A vehicle powertrain for driving wheels of a vehicle, comprising:
a transmission having an operational axis and at least one transmission ratio change device;
a primary prime mover coupled to the transmission, having an operational axis substantially aligned with the operational axis of the transmission, and further having an electronically controlled throttle;
a secondary prime mover being selectively coupled to the transmission, having an operational axis substantially parallel to and offset from the operational axis of the primary prime mover, and further having an electronically controlled throttle;
a passive coupling substantially concentric with the operational axes of the transmission and primary prime mover, and interposed between the transmission and the primary and secondary prime movers;
a high-speed starter configuration operatively engaged with the secondary prime mover for activating the secondary prime mover; and
at least one controller in communication with the electronically controlled throttles and the at least one transmission ratio change device, and being configured to control operation of the first and secondary prime movers and the transmission, wherein the at least one controller is responsive to differences between powertrain torque demand and torque available from the primary prime mover and the transmission within its present gear ratio to carry out at least one of the following operations, increase output of the primary prime mover, downshift the transmission to a lower gear ratio, or activate the secondary prime mover and increase output of the secondary prime mover to meet the torque demand, wherein the at least one controller is configured to control operation of the first and secondary prime movers and the transmission and to carry out the following operations:
determining vehicle speed, transmission mode selection, and vehicle accelerator position;
determining powertrain torque demand by sensing accelerator position and calculating a rate of change of the accelerator position;
comparing the powertrain torque demand with torque available from the primary prime mover and the transmission within its present gear ratio;
adjusting the electronically controlled throttle of the primary prime mover to increase output of the primary prime mover, if torque demand does not exceed torque available from the primary prime mover and the transmission within its present gear ratio;
downshifting the transmission to a lower gear ratio, if torque demand exceeds torque available from the primary prime mover and the transmission within its present gear ratio;
comparing torque demand to torque available from the primary prime mover and the transmission at the downshifted gear ratio;
adjusting the electronically controlled throttle of the primary prime mover to increase output of the primary prime mover, if torque demand does not exceed torque available from the primary prime mover and the transmission at the downshifted gear ratio;
activating the starter to activate the secondary prime mover and adjusting the electronically controlled throttle of the secondary prime mover to meet the torque demand; and
upshifting the transmission to a higher gear ratio.

8. The vehicle powertrain of claim 7, wherein the prime movers are part of a unified engine block, with shared passages for lubricant and coolant.

9. The vehicle powertrain of claim 7, wherein the coupling includes an overrunning one-way clutch.

10. The vehicle powertrain of claim 9, wherein the coupling further includes a chain drive coupled between the overrunning one-way clutch and the secondary prime mover.

11. The vehicle powertrain of claim 7, wherein the starter ratio is less than 20 to 1.

12. A vehicle, comprising:
a device to sense vehicle speed;
a device to sense vehicle transmission mode selection;
a device to sense vehicle accelerator position;
a drivetrain including driving wheels coupled to an axle and driveshaft;
a powertrain coupled to the driveshaft, and including:
a transmission having an operational axis and at least one transmission ratio change device;
a primary prime mover coupled to the transmission, having an operational axis substantially aligned with the operational axis of the transmission, and further having an electronically controlled throttle;
a secondary prime mover being selectively coupled to the transmission, having an operational axis substantially parallel to and offset from the operational axis of the primary prime mover, and further having an electronically controlled throttle;

a coupling substantially concentric with the operational axes of the transmission and primary prime mover, and interposed between the transmission and the primary and secondary prime movers;

a starter operatively engaged with the secondary prime mover for activating the secondary prime mover; and at least one controller in communication with the aforementioned sensing devices, the electronically controlled throttles, and the at least one transmission ratio change device, and being configured to control operation of the first and secondary prime movers and the transmission and to carry out the following operations:

determining vehicle speed, transmission mode selection, and vehicle accelerator position;

determining powertrain torque demand by calculating a rate of change of vehicle accelerator position;

comparing the powertrain torque demand with torque available from the primary prime mover and the transmission within its present gear ratio;

adjusting the electronically controlled throttle of the primary prime mover to increase output of the primary prime mover, if torque demand does not exceed torque available from the primary prime mover and the transmission within its present gear ratio;

downshifting the transmission to a lower gear ratio, if torque demand exceeds torque available from the primary prime mover and the transmission within its present gear ratio;

comparing torque demand to torque available from the primary prime mover and the transmission at the downshifted gear ratio;

adjusting the electronically controlled throttle of the primary prime mover to increase output of the primary prime mover, if torque demand does not exceed torque available from the primary prime mover and the transmission at the downshifted gear ratio;

activating the starter to activate the secondary prime mover and adjusting the electronically controlled throttle of the secondary prime mover to meet the torque demand; and upshifting the transmission to a higher gear ratio.

13. The vehicle powertrain of claim 12 wherein the prime movers are part of a unified engine block, with shared passages for lubricant and coolant.

14. The vehicle powertrain of claim 12 wherein the coupling includes an overrunning one-way clutch.

15. The vehicle powertrain of claim 14, wherein the coupling further includes a chain drive coupled between the overrunning one-way clutch and the secondary prime mover.

16. The vehicle powertrain of claim 12 wherein the starter is coupled to the secondary prime mover with a high-speed starter configuration.

* * * * *